United States Patent [19]

Collett et al.

[11] 4,256,086
[45] Mar. 17, 1981

[54] METHOD FOR RAPIDLY IGNITING COMBUSTIBLE MATERIAL ON A FIELD

[76] Inventors: Kenneth R. Collett, 2566 Neff Ct., Boise, Id. 83702; LeRoy C. Hansen, 7945 Knox Butte Rd., Albany, Oreg. 97321

[21] Appl. No.: 937,188

[22] Filed: Aug. 28, 1978

[51] Int. Cl.³ .............................................. F23C 5/00
[52] U.S. Cl. ................................ 126/271.2 C; 43/144; 47/1.44
[58] Field of Search ................ 126/271.2 C, 271.2 R; 43/144; 44/34; 47/1.44; 37/12; 56/1

[56] References Cited

U.S. PATENT DOCUMENTS

| | | | |
|---|---|---|---|
| 1,512,822 | 10/1924 | Daering | 126/271.2 C X |
| 1,851,378 | 3/1932 | Taylor et al. | 126/271.2 C |
| 1,851,379 | 3/1932 | Worthley | 126/271.2 C X |
| 2,548,065 | 4/1951 | Reister | 43/144 X |
| 2,694,393 | 11/1954 | Simpson | 126/271.2 C |
| 2,706,978 | 4/1955 | Larson | 126/271.2 C |
| 3,805,766 | 4/1974 | Hammon | 126/271.2 C X |

Primary Examiner—Samuel Scott
Assistant Examiner—Randall L. Green
Attorney, Agent, or Firm—Kolisch, Hartwell & Dickinson

[57] ABSTRACT

The present invention is directed to a method for rapidly igniting combustible material over a predetermined area of a field which contemplates positioning a plurality of combustible elements at spaced-apart locations adjacent a first boundary of the predetermined area and extending a line from each element across the field to a position adjacent to a second boundary. Each line and its associated element is then advanced substantially across the predetermined area from the first boundary to the second boundary. The result is a rapid torching or ignition of the combustible material so that a concentrated heat source is provided which gives buoyancy to the smoke thereby lifting same into the upper atmosphere.

13 Claims, 2 Drawing Figures

METHOD FOR RAPIDLY IGNITING COMBUSTIBLE MATERIAL ON A FIELD

BACKGROUND AND SUMMARY OF THE INVENTION

The present invention relates to sanitizing agricultural fields after crop harvest by thermal treatment, and more particularly to a novel method for rapidly igniting combustible residue material on a field.

In certain agricultural practices, it is necessary to thermally treat a field after crop harvest in order to prepare the field for subsequent agricultural use. For instance, in the production of grass seed crops, thermal treatment through the form of field burning is necessary in order to control weeds, insects, rodents and diseases. In addition, field burning adequately removes crop residue such as stalks remaining after crop harvest.

Thermal treatment has conventionally taken the form of open field burning in which ground fires are initiated and permitted, with some degree of control, to run their course over a field. This procedure results in unacceptable air quality due to low altitude smoke pollution. As a consequence, legislation has been enacted, for instance in Oregon, which severely limits open field burning. One substitute for open field burning has been the provision of machines which are operable for traveling over a field and initiating a fire. However, known machines are extremely costly and their useful life is relatively unknown because of the high temperatures under which they must operate. In addition, the machines operate at low speeds and hence field burning is burdensomely time consuming.

As an alternative to machine burning, it has also been proposed to decrease air degradation by providing a so-called "big burn" process. The big burn process contemplates rapidly burning a large area of a field so that a concentrated heat source results and gives sufficient buoyancy to smoke produced by the burning so that the smoke is rapidly expelled into the upper atmosphere. With the smoke located at a relatively high altitude, it will be subject to more rapid dissipation by winds and therefore alleviate air pollution problems in the lower atmosphere.

Of course, it can be appreciated that in order to effectuate a "big burn", it is necessary to rapidly ignite a large field area. One proposed solution has been to dispatch a battery of helicopters over a field and dispense fuel over the area to be burned. The fuel is simultaneously ignited and a helicopter, in effect, has a fire trailed behind it. Of course, it can be realized that this is an extremely dangerous procedure and prohibitively expensive. Another proposed solution has been to provide burning elements or igniters pulled by a group of radio-controlled tractors. This technique also is expensive and time consuming.

Accordingly, it is a general object of the present invention to provide a method for rapidly igniting combustible material over a predetermined area of a field which contemplates positioning a plurality of combustible elements at spaced-apart locations adjacent a first boundary of the predetermined area. Lines are extended from each element across the length or width of the field to a position adjacent to a second boundary. Each line is then advanced or drawn so that its associated element is moved substantially across the predetermined area from the first boundary to the second boundary. The result is that a field may be rapidly torched by an extremely simple method which ensures burning a large area so that a concentrated heat source is created.

Another object of the present invention is to provide a motive or power source such as a line takeup means positioned adjacent to the second boundary which is secured to the lines operable for drawing each line and its associated element toward the second boundary. The power source may, in one embodiment, include provision of winches which are operable for drawing in the lines at substantially equal rates. Thus, as the combustible elements are rapidly drawn across the field, at substantially equal rates, a large area of the field will be burned substantially simultaneously. As indicated previously, with torching of a substantially large area, smoke management becomes significantly more feasible.

These and additional objects and advantages of the present invention will be more clearly understood from a consideration of the drawings and the detailed description of the preferred embodiment.

DETAILED DESCRIPTION OF THE PREFERRED EMBODIMENT

Figure 1:
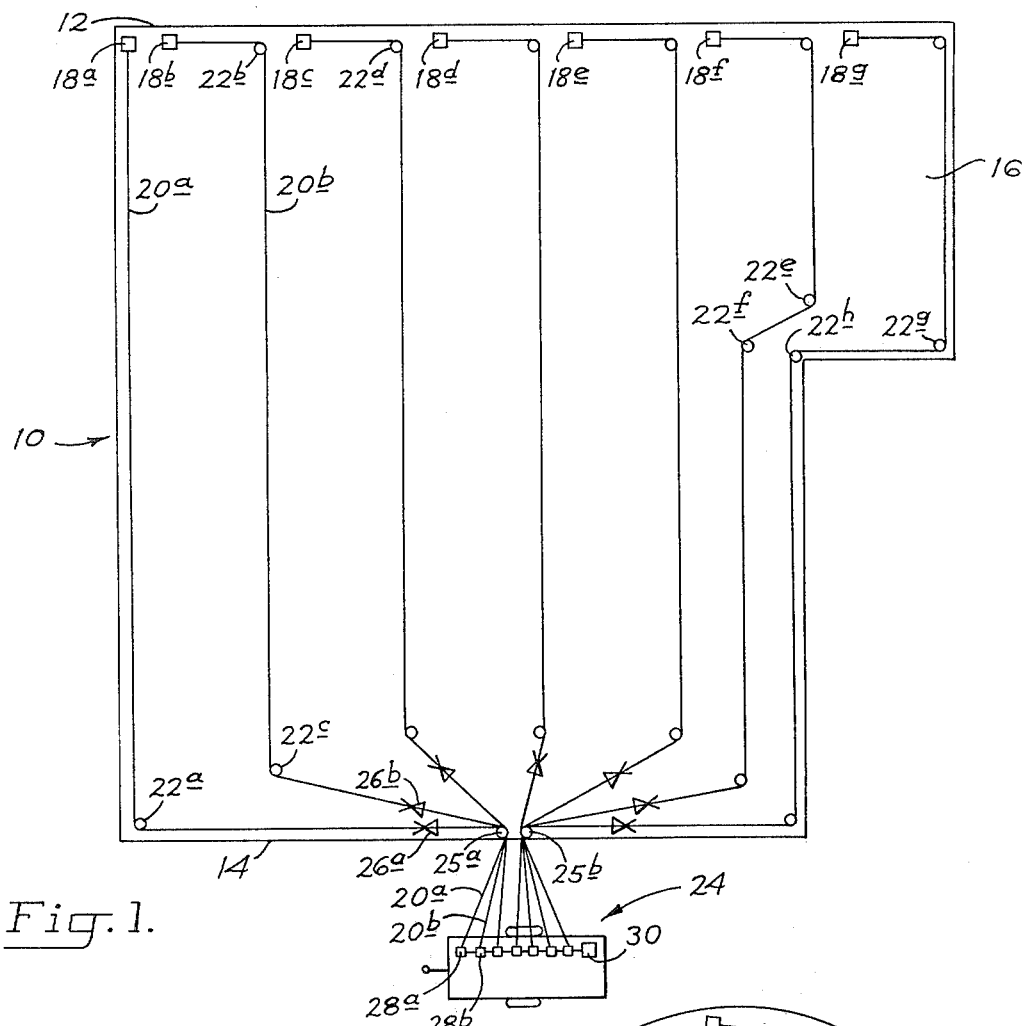
FIG. 1 is a schematic top plan view of a predetermined area of a field illustrating the use of combustible elements, etc. in order to rapidly ignite combustible material according to the method of the present invention.

Turning now to the drawings, and referring initially to FIG. 1, a method according to the present invention will be described with reference to its use on a ground surface such as a field, generally designated at 10. The field is assumed to include crop residue such as straw, stubble, etc. after harvest and includes a predetermined area to be torched or burned which is defined by boundaries. A first boundary is indicated at 12 and an opposed second boundary at 14. Of course, remainder portions of the field may extend beyond the boundaries. As shown in FIG. 1, the predetermined area of field 10 is of generally rectangular configuration but includes an offset portion generally indicated at 16.

Field 10 is prepared so that combustible material or residue thereon may be rapidly ignited in the following manner. Depending upon the size of the field, a plurality of combustible elements are positioned at spaced-apart locations adjacent first boundary 12. For instance, combustible elements 18a–18g are positioned adjacent first boundary 12. Each of the combustible elements in a brand which may be ignited and each is connected to a line which extends across the field to a position adjacent second boundary 14. For instance, combustible element 18a is connected to a line 20a which extends across field 10 to a position adjacent second boundary 14. Positioned adjacent the left hand bottom corner of field 10 is a directing means 22a around which a stretch of line 20a is guided in a direction toward a a line takeup means generally indicated at 24. Suitable brands may include containers filled with fuel or other suitable combustible material.

Considering combustible elements 18b–18g, as they are initially positioned adjacent first boundary 12 prior to being ignited, it can be seen that each is also connected to a line which extends laterally across field 10. More specifically, combustible element 18b is connected to a line 20b which initially extends from the combustible element in a lateral direction so that a stretch thereof is wrapped around a portion of a directing means 22b. The line then extends transversely of field 10 around another directing means 22c. Similarly, each of the remaining combustible elements is provided with a line extending laterally therefrom and around suitable directing means toward a guide or final directing means 25a, 25b which channel the lines toward takeup means 24. It is to be noted that each directing means may be of relatively simple construction, i.e. stakes inserted into the ground provide suitable turning points for the combustible elements as they are drawn therearound. Severing means, the purpose of which will be latter described, are shown at 26a, 26b.

Considering takeup means 24, it is to be noted that FIG. 1 is a schematic representation, and as such, takeup means 24 represents a plurality of power-driven winches each of which is secured to an associated line and suitably mounted on a movable object such as a trailer. More specifically, it can be seen that a takeup means 24 includes winches 28a, 28b to which are suitably connected lines 20a, 20b, respectively, in order to draw or reel in the lines. Similarly, the remaining lines extending from their associated combustible elements are connected to a winch. The winches may be power driven, and a suitable power source is indicated at 30.

Thus, in order to actually torch a field, such as field 10, for a "big burn" according to the present invention, combustible elements 18a–18g are initially positioned adjacent first boundary 12. Lines associated with each combustible element are extended around suitable directing means or turning stakes in order to ensure adequate torching of the field adjacent its external boundaries. Depending upon the condition of the field, i.e. the moisture content and depth of residue, directing means 22b, 22d, etc. are spaced a suitable distance apart so that after the combustible elements have been drawn therearound, there will be close enough spacing of the combustible elements for complete burning to occur. Thus, assuming the combustible elements are initially positioned adjacent first boundary 12 as shown, the elements are suitably ignited so that a series of torches are provided. The power source is actuated so that the winches are driven to reel in their associated lines. Assuming that the winches are driven at approximately the same rate, it can be seen that the combustible elements will be drawn toward directing means 25a, 25b substantially simultaneously. Of course, it may be advantageous to vary the rate of each winch depending upon residue moisture and accumulation.

Considering combustible element 18b, it can be seen that it will be advanced toward directing means 22b in a direction paralleling that of first boundary 12. Approaching directing means 22b and traveling therearound, combustible element 18b will have its direction of advancement varied so that it will travel along a path transversely of field 10 toward second boundary 14. Similarly, combustible elements 18c–18e will follow paths initially paralleling first boundary 12 and then paths extending generally transversely of field 10. The result is a continuous ignition of the residue material along "fire trails" which spread toward one another for combusting the entire predetermined area. It is also to be noted that combustible elements 18f, 18g travel around additional directing means such as indicated at 22e, 22f, etc. intermediate their paths so that adequate torching of offset portion 16 is provided.

It is further to be noted that directing means such as indicated at 22a, 22c, etc. are provided so that all of the lines will be directed into guide or final directing means 25a, 25b. Directing means 22a, 22c, etc. ensure that the bottom portion of field 10 adjacent second boundary 14 is adequately torched. In addition, it is to be noted that cutoff means 26a, 26b, etc. may be suitably actuated so that the combustible elements are not drawn through final directing means 25a, 25b after a predetermined point has been reached by a combustible element.

There are a number of significant advantages with the method of the present invention as described above. For instance, the method is extremely simple and utilizes inexpensive and readily available materials. No large machines or complicated equipment is required in order to provide a "big burn". Only combustible elements in the form of torches or brands and suitable lines disposed around appropriately positioned turning stakes leading to a takeup means are required. Upon advancing or drawing the combustible elements along paths extending transversely of the field, the field's combustible material may be rapidly ignited thereby providing a concentrated heat source created by burning a large predetermined area of the field which gives sufficient buoyancy to the smoke so that it is elevated to the upper atmosphere. Of course, it must be appreciated that the rate of advancement of the combustible elements is dependent upon the rate at which the winches are driven, and such rate may be dependent upon various field conditions. In any event, it is to be appreciated that the takeup means may be disposed externally of the second boundary and the cutoff means ensure that the extent of advancement of the combustible elements are suitably limited so as not to be drawn into the motive means. Simplicity of materials and operation together with the safety inherent in the method make it extremely advantageous.

Figure 2:
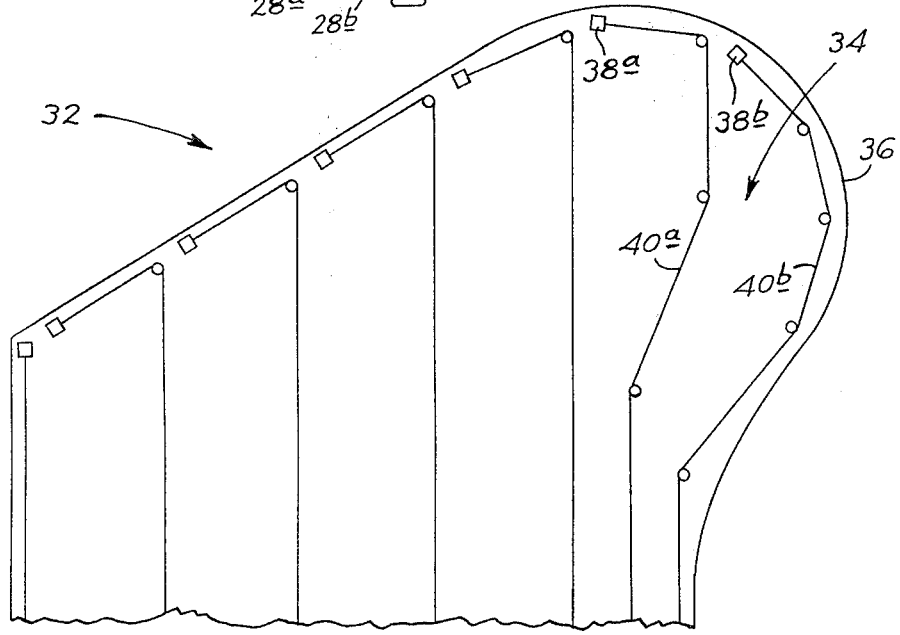
FIG. 2 is a view similar to FIG. 1 but illustrates suitability of the method of the present invention to an irregularly shaped field.

In addition, the method of the present invention may be readily adapted to fields having irregular peripheries or boundaries. For instance, as shown in FIG. 2, it can be seen that a field generally indicated at 32 includes a section 34 having a rounded or curved boundary 36. In order to ensure adequate combusting of material in section 34, suitable positioning of directing means is readily achieved. For instance, combustible elements 38a, 38b are suitably connected to lines 40a, 40b, respectively which are positioned around directing means or turning stakes as shown. With reference to line 40b, it can be seen that it is positioned around turning stakes which track, at least somewhat, the curvature of boundary 36. As a consequence, as line 40b is reeled in by a suitable winch (not shown), combustible element 38b will travel in a series of paths, each having a different direction, which will ensure adequate torching of the region adjacent boundary 36.

Similarly, line 40a is provided with offset turning stakes to that adequate torching of the irregularly shaped area may be achieved. The important point to remember is that the provision of combustible elements which are advanced or drawn across a field so that the direction of advancement may be varied by turning stakes ensures that any field configuration is suitable for field burning using the method of the present invention.

Another advantage of the present invention, and its attendant simplicity of materials, is the fact the takeup means including the winches may be readily transported, as on a trailer, to another field after a prior field has undergone a "big burn". Because the takeup means may be positioned externally of the portion of the field being torched, there is no heat damage to its operational construction. This is to be specifically contrasted with conventional machine burning which requires large and cumbersome machines to create fires and then advance over a path always subject to the damaging heat produced by the machine.

While the present invention has been particularly shown and described with references to the foregoing preferred embodiment, it is to be understood that other changes in form and detail may be made within the spirit and scope of the invention as defined in the appended claims.

It is claimed and desired to secure by Letters Patent:

1. A method for rapidly igniting combustible material over a predetermined area of a ground surface between first and second boundaries comprising:
   extending a line between the boundaries across the predetermined area;
   attaching a combustible element to said line adjacent the first boundary;
   positioning a line takeup means adjacent the second boundary and attaching the line to said takeup means;
   igniting said element; and
   advancing said line and its associated element substantially across the predetermined area by operating the takeup means to draw the line and its associated element toward the second boundary.

2. A method for rapidly igniting combustible material over a predetermined area of a ground surface between first and second boundaries comprising:
   extending a plurality of lines between the boundaries across the predetermined area;
   attaching a combustible element to each line adjacent the first boundary;
   positioning a line takeup means adjacent the second boundary and attaching each line to said takeup means;
   igniting said elements; and
   advancing said lines and their associated elements across the predetermined area by operating the takeup means to draw each line and its associated element toward the second boundary.

3. The method of claim 2 wherein said takeup means includes a plurality of winches, each winch being operable for drawing in an associated line connected thereto.

4. The method of claim 4 wherein said winches are operable for drawing in the lines at substantially equal rates.

5. The method of claim 2 further including the step of severing selected lines upon their associated elements being advanced to predetermined positions in the field.

6. The method of claim 2 further including positioning directing means on the predetermined area for varying the direction of advancement of at least one of the lines.

7. A method for rapidly igniting combustible material over predetermined area of a field comprising:
   positioning a plurality of combustible elements at spaced-apart locations on the field;
   igniting said elements; and
   advancing each element substantially across the predetermined area by a motive means positioned externally of the predetermined area.

8. A method for rapidly igniting combustible material over an area of ground surface comprising:
   extending a line across the area;
   attaching a combustible element to one end of said line;
   attaching the other end of said line to a takeup means;
   igniting said element; and
   advancing the element substantially across the area by operating the takeup means to draw the line and thereby vary the distance between the combustible element and the takeup means.

9. The method of claim 8 further including the step of severing the line upon the combustible element being advanced to a predetermined position.

10. The method of claim 8 further including positioning directing means for varying the direction of advancement of the line.

11. A method for rapidly igniting combustible material over an area of ground surface comprising:
    extending a plurality of lines across the area;
    attaching a combustible element to one end of each line;
    attaching the other end of each line to a takeup means;
    igniting the elements; and
    advancing the elements substantially across the area by operating the takeup means to draw the lines and thereby vary the distance between the combustible elements and the takeup means.

12. The method of claim 11 wherein said takeup means includes a plurality of winches, each winch being operable for drawing in an associated line connected thereto.

13. The method of claim 12 wherein the winches are operable for drawing in the lines at substantially equal rates.

* * * * *